United States Patent
Gunning et al.

(10) Patent No.: US 8,937,263 B2
(45) Date of Patent: Jan. 20, 2015

(54) CAPACITIVE DISCHARGE WELDING POWER SUPPLY AND CAPACITIVE DISCHARGE WELDER USING THE SAME

(75) Inventors: Kevin Gunning, Altadena, CA (US); Stanley Levy, Arcadia, CA (US); Glen Holt Humphrey, North Hills, CA (US)

(73) Assignee: Amada Miyachi America, Inc., Monrovia, CA (US)

( * ) Notice: Subject to any disclaimer, the term of this patent is extended or adjusted under 35 U.S.C. 154(b) by 1656 days.

(21) Appl. No.: 12/011,273

(22) Filed: Jan. 24, 2008

(65) Prior Publication Data

US 2008/0173626 A1  Jul. 24, 2008

Related U.S. Application Data

(60) Provisional application No. 60/897,379, filed on Jan. 24, 2007.

(51) Int. Cl.
*B23K 11/26* (2006.01)
*B23K 9/10* (2006.01)

(52) U.S. Cl.
CPC ................................... *B23K 9/1081* (2013.01)
USPC .......................................... 219/113; 219/112

(58) Field of Classification Search
USPC ............. 219/112, 113, 130.1, 130.21, 137 PS
See application file for complete search history.

(56) References Cited

U.S. PATENT DOCUMENTS

| | | | | |
|---|---|---|---|---|
| 3,805,143 A | * | 4/1974 | Tauern et al. | 363/88 |
| 5,272,313 A | * | 12/1993 | Karino et al. | 219/130.21 |
| 6,614,670 B1 | * | 9/2003 | Geissler | 363/56.01 |
| 2005/0253165 A1 | * | 11/2005 | Pace et al. | 257/139 |

OTHER PUBLICATIONS

International Search Report of PCT/US08/01019 dated Jun. 10, 2008.

* cited by examiner

*Primary Examiner* — Brian Jennison
(74) *Attorney, Agent, or Firm* — Christie, Parker & Hale, LLP (57) ABSTRACT

A capacitive discharge (CD) welder includes a charging circuit, a capacitor bank, an insulated gate bipolar transistor (IGBT), a pulse transformer and a secondary circuit. The charging circuit takes incoming electricity and charges a capacitor bank. The capacitor bank stores energy. The IGBT electrically connects and disconnects the capacitor bank to the pulse transformer. The pulse transformer reduces voltage from that stored in the capacitor bank to the desired welding voltage. The secondary circuit electrically connected to the pulse transformer provides a welding current corresponding to the output to the material being welded.

19 Claims, 6 Drawing Sheets

CAPACITIVE DISCHARGE WELDING POWER SUPPLY AND CAPACITIVE DISCHARGE WELDER USING THE SAME

CROSS-REFERENCE TO RELATED APPLICATION

This application claims priority to and the benefit of U.S. Provisional Application No. 60/897,379 filed Jan. 24, 2007, the entire content of which is incorporated herein by reference.

FIELD OF THE INVENTION

The present invention relates to a capacitive discharge welding power supply, and more particularly, to a capacitive discharge welder using the capacitive discharge welding power supply.

BACKGROUND OF THE INVENTION

CD welders have been used in a variety of industries for many years. The traditional weld process was to charge a capacitor bank to a relatively high voltage (hundreds or even thousands of volts), then fully discharge the capacitor bank through the pulse transformer and into the part to be welded. For improved welding results, many controls offer dual pulse welding capabilities wherein this process is repeated twice for each part to be welded. The first pulse is typically done at a low energy to "condition" the parts to be welded. The second pulse is then done at a higher energy to complete the weld.

CD welders have the advantage of an output that is independent of the local line voltage. The charging circuit charges the capacitor bank up to a user-programmed voltage. The energy delivered by the welder depends only upon the value of the capacitors and their voltage by the formula $E=\frac{1}{2}CV^2$ where E is the energy, C is the capacitance, and V is the capacitor bank voltage. As the line voltage varies, the time to charge the capacitor bank may vary, but the overall energy delivered does not vary. This is an advantage when compared with AC type welders that draw their energy directly off the incoming line and are susceptible to output variation when the incoming voltage varies during the weld.

One alternate weld process is known as arc welding. A welding power supply is used in arc welding to generate an electric arc between an electrode and the base material to melt the metals at the welding point. The arc welding process requires an ongoing electric current (either direct (DC) or alternating (AC) current) to maintain the arc for a substantial period of time. This contrasts with capacitor discharge welders, which are single-shot devices. It should be noted that in arc welding, the parts to be joined are heated by the electric arc, and not by the resistance of the parts to be joined as the current passes through them. In addition, the voltage required to strike and maintain this arc is typically much higher that for capacitor discharge welders. Striking an arc can require 80V or more, while capacitor discharge welding is done at 10V or less. These differences mean that although similar electronic components may be used in both types of welders, the details of how they are used differ significantly.

Typical CD welders today use a type of Silicon Controlled Rectifier (SCR) to connect the capacitor bank to the pulse transformer. A characteristic of these switches is that they can be turned on with a control signal input, but that they cannot be turned off until the current through them goes to zero. In short, they are turned on, and stay on until the current reaches zero (as when the capacitor bank is nearly depleted).

Prior art also includes CD welders that used thyristors (Gate Turn Off or GTO devices) to connect the capacitor bank to the pulse transformer. However, these devices are typically used in the same manner as the SCR described above.

SUMMARY

In an exemplary embodiment according to the present invention, a capacitive discharge (CD) welder is provided. The CD welder includes a charging circuit, a capacitor bank, an insulated gate bipolar transistor (IGBT), a pulse transformer and a secondary circuit. The charging circuit takes incoming electricity and charges a capacitor bank. The capacitor bank stores energy. The IGBT electrically connects and disconnects the capacitor bank to the pulse transformer. The pulse transformer reduces voltage from that stored in the capacitor bank to the desired welding voltage. The secondary circuit electrically connected to the pulse transformer provides a welding current corresponding to the output to the material being welded.

In one exemplary embodiment, the current is turned off early to avoid transformer saturation and overheating.

In another exemplary embodiment, the current is turned on and off quickly multiple times at the start to reduce the rate of rise of the current.

In another exemplary embodiment, the current is turned on and off quickly once to generate a short pulse with high peak current.

In another exemplary embodiment, a capacitive discharge welder includes: a capacitor bank for storing energy; a pulse transformer for converting a first voltage stored in the capacitor bank to a second voltage; an IGBT for selectively electrically connecting the capacitor bank to the pulse transformer; and a secondary circuit electrically connected to the pulse transformer. The secondary circuit supplies a welding current corresponding to an output having the second voltage of the pulse transformer to a part to be welded.

In another exemplary embodiment, a method of welding a part using a capacitive discharge welder including a pulse transformer, is provided. The method includes: applying a current to the part; and turning off the current prior to a saturation of the pulse transformer.

In another exemplary embodiment, a capacitive discharge welder includes: a capacitor bank for storing energy; a pulse transformer for converting a first voltage stored in the capacitor bank to a second voltage; an semiconductor switching device for selectively electrically connecting the capacitor bank to the pulse transformer, the semiconductor switching device configured to electrically disconnect the capacitor bank from the pulse transformer prior to near depletion of energy stored in the capacitor bank in response to a control signal; a controller for providing the control signal to the semiconductor switching device; and a secondary circuit electrically connected to the pulse transformer. The secondary circuit supplies a welding current corresponding to an output having the second voltage of the pulse transformer to a part to be welded.

BRIEF DESCRIPTION OF THE DRAWINGS

These and/or other aspects and features of various embodiments of the invention will become apparent and more readily appreciated from the following description of examples of embodiments, taken in conjunction with the accompanying drawings described below.

DETAILED DESCRIPTION

In an exemplary embodiment according to the present invention, a circuit is used to prevent saturation in a pulse transformer of a capacitive discharge welder. In this embodiment, the current to the primary coil of the pulse transformer is turned off early to avoid transformer saturation and overheating. In another exemplary embodiment the current to the primary coil of the pulse transformer is turned on and off (e.g., multiple times) quickly at the start to reduce the rate of rise of the current. In yet another exemplary embodiment, the current to the primary coil of the pulse transformer is turned on and off quickly once to generate a short pulse with high peak current.

In other embodiments, the capacitive discharge welder may have one, more than one, or all of the features of the above embodiments.

Figure 1:
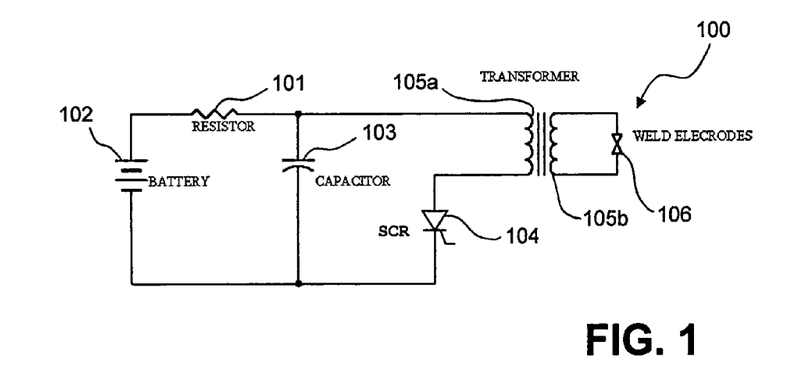
FIG. 1 is a schematic diagram of a conventional capacitive discharge welder.

As can be seen in the schematic circuit diagram of FIG. 1, a conventional capacitive discharge (CD) welder 100 includes a power source (battery) 101, coupled to a capacitor 103 via a resistor 101. An SCR 104 and a primary coil 105a (primary side or input side) of the pulse transformer are coupled in series across the capacitor 103. A secondary coil 105b (secondary side or output side) of the pulse transformer is coupled to weld electrodes 106 for applying the output of the pulse transformer to materials or parts to be welded. In one embodiment, the ratio of windings between the primary and secondary coils is 30:1, however, the present invention is not limited thereto.

In FIG. 1 (and in FIG. 2 below), a power input (e.g., AC input) is represented by a battery and a charging circuit is represented as a resistor, for example.

Figure 2:
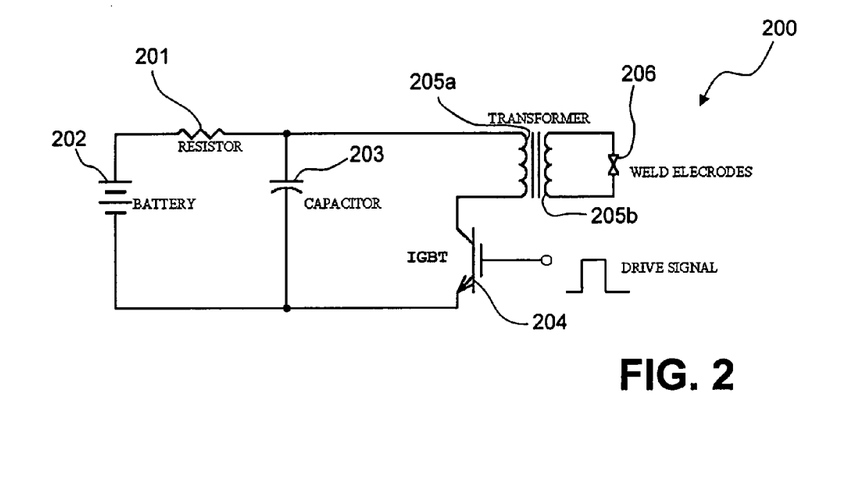
FIG. 2 is a schematic diagram of a capacitive discharge welder in an exemplary embodiment according to the present invention.

As can be seen in the schematic circuit diagram of FIG. 2, a capacitive discharge (CD) welder 200 in an exemplary embodiment according to the present invention, includes a power source (battery) 202, coupled to a capacitor 203 via a resistor 201. An insulated gate bipolar transistor (IGBT) 204 and a primary coil (primary side or input side) 205a of the pulse transformer are coupled in series across the capacitor 203. A secondary coil 205b (secondary side or output side) of the pulse transformer is coupled to weld electrodes 206 for applying the output of the pulse transformer to materials or parts to be welded.

One known issue with CD welders is that the pulse transformers can reach their saturation points. When the transformer saturates, increased current input to the primary side will merely result in losses within the transformer (which generates waste heat) and not produce additional secondary output. Traditional CD welder designs have had to allow for this possibility and design in additional cooling to account for it.

In one embodiment, to avoid transformer saturation, the IGBT 204 is turned off after a delay, which may be programmed by the user. The delay may be provided, for example, by programming a controller (see FIG. 3) for turning the IGBT off and on. The cut off of the primary current has a very little effect on the waveform of the secondary current. Also, short, low energy pulses can be created from a fully charged capacitor bank by turning on and off the IGBT quickly. This allows the user to generate several short pulses in close proximity to each other as there is no need (or less need) to recharge the capacitor between the pulses.

Figure 3:
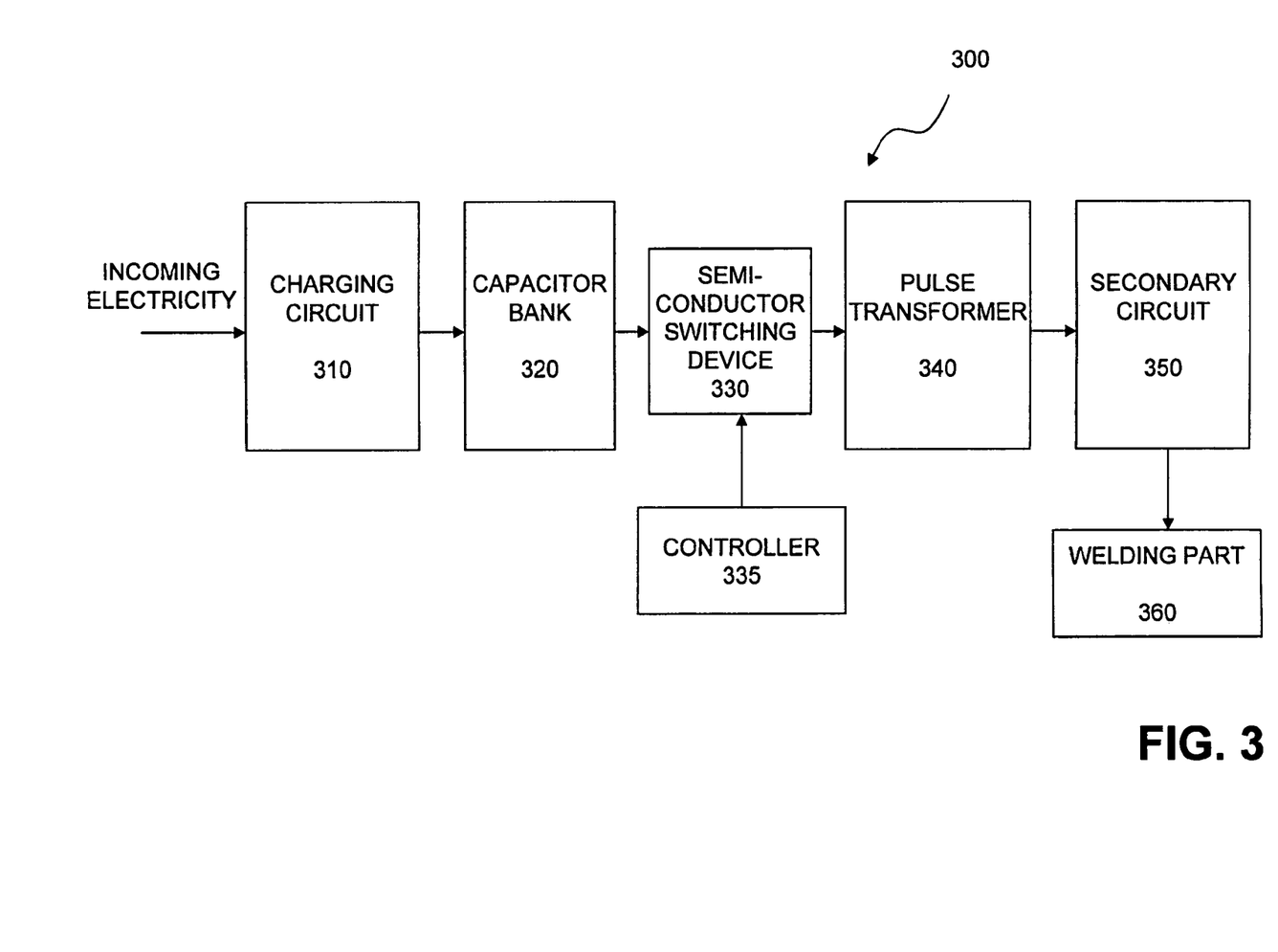
FIG. 3 is block diagram of a capacitive discharge welder in an exemplary embodiment according to the present invention.

FIG. 3 is block diagram of a capacitive discharge welder in an exemplary embodiment according to the present invention. As can be seen in FIG. 3, the capacitive discharge welder includes a charging circuit 310 that takes incoming electricity and charges a capacitor bank 320, the capacitor bank 320 for storing energy, a semiconductor switching device 330 (e.g., IGBT or any other suitable semiconductor switching device) that connects and disconnects the capacitor bank 320 and the pulse transformer 340, a pulse transformer 340 that reduces the voltage from that stored in the capacitor bank 320 to the desired welding voltage, and a secondary circuit 350 electrically connected to the output of the pulse transformer 340 supplies a welding current corresponding to the output of the pulse transformer 340 to the material being welded (e.g., welding part 360). A controller 335 provides control signals to the IGBT 330 to control turning on and off of the IGBT, thereby selectively coupling the capacitor bank 320 to the pulse transformer 340. The controller 335, for example, may be programmed to turn off the IGBT after a delay and/or to rapidly turn the IGBT off and on.

Therefore, the above embodiment of the present invention includes an improved type of electric switching element (i.e., a semiconductor switching device such as an IGBT). This improved switch allows the current to be shut off before the capacitors are discharged. This allows faster cycle times for the welding, reduced time between pulses in multi-pulse welding, reduced energy consumption, less waste heat generated within the control, and adjustable pulse durations for improved or optimum welding.

Figure 4:
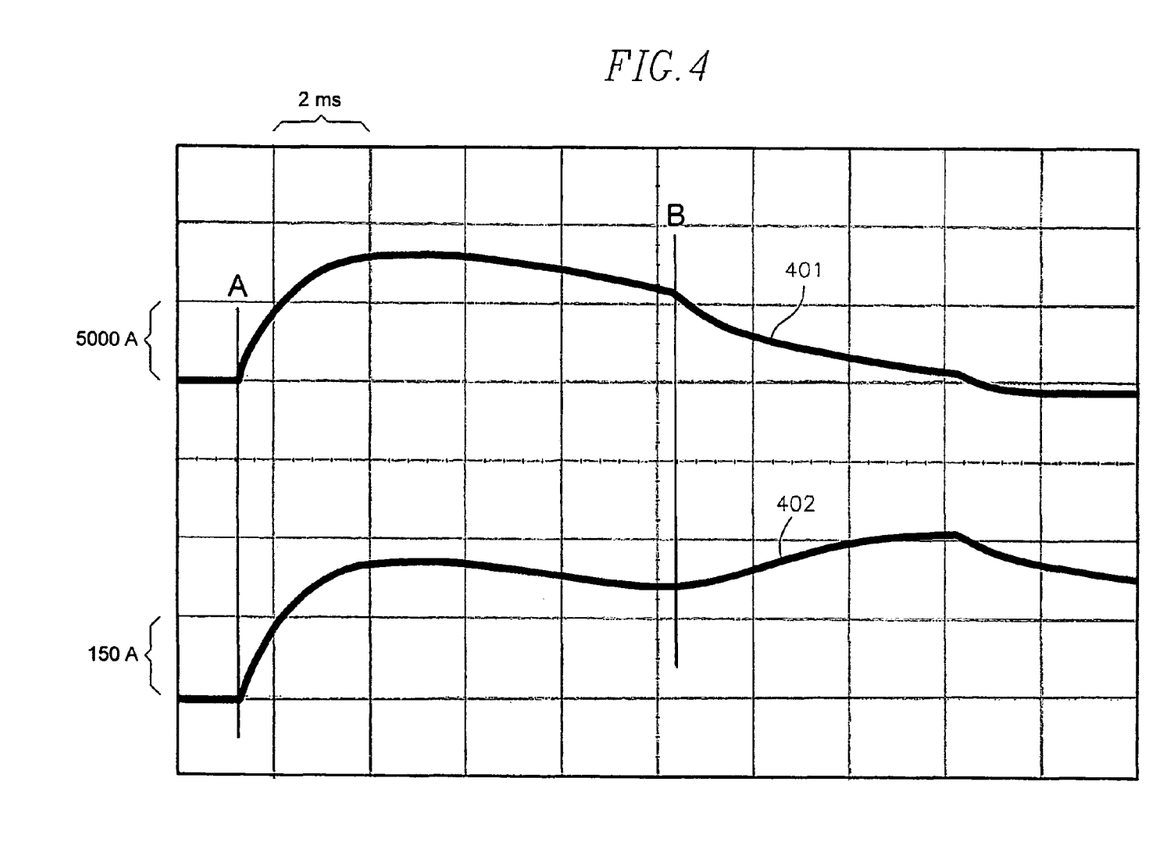
FIG. 4 is a plot of waveforms, in which the top waveform (i.e., secondary waveform) shows the secondary current of a CD welder fired through a large fixed load, and the bottom waveform (i.e., primary waveform) shows the current in the primary side of the CD welder.

FIG. 4 is a plot that shows an oscilloscope trace of two waveforms. The secondary waveform 401 shows the secondary current of a CD welder fired through a large fixed load (e.g., a giant resistor that does not heat up and change resistance during this type of weld pulse). The primary waveform 402 shows the current in the primary side of welder.

As indicated in FIG. 4, each division in the horizontal direction represents 2 ms. Further, for the secondary waveform 401, each division in the vertical direction represents about 5000 A and for the primary waveform 402, each division in the vertical direction represents about 150 A. It can be seen that the switch is closed at time A to supply energy to the primary side (shown in the primary waveform 402) of the pulse transformer. Then the current across the secondary coil (shown in the secondary waveform 401) also starts to increase.

It can be seen in FIG. 4 that during the second half of the weld, starting at about time B, the primary current starts to go back up as shown in the waveform 402, while the secondary current does not increase (e.g., as shown by the decrease in the waveform 401). Hence, the primary current is increased without an increase in secondary current, indicating lower impedance during the latter part of the weld. The second "hump" is due to transformer saturation and that the secondary output at this stage would be largely independent of the primary input. Therefore, more current is being applied to the primary side, and not getting more useful energy out of the secondary side.

In one exemplary embodiment, the IGBT is cut off after a user programmed delay. The primary current could be cut off as the transformer reached saturation, and that this would have very little effect on the waveform of the secondary current.

Figure 5:
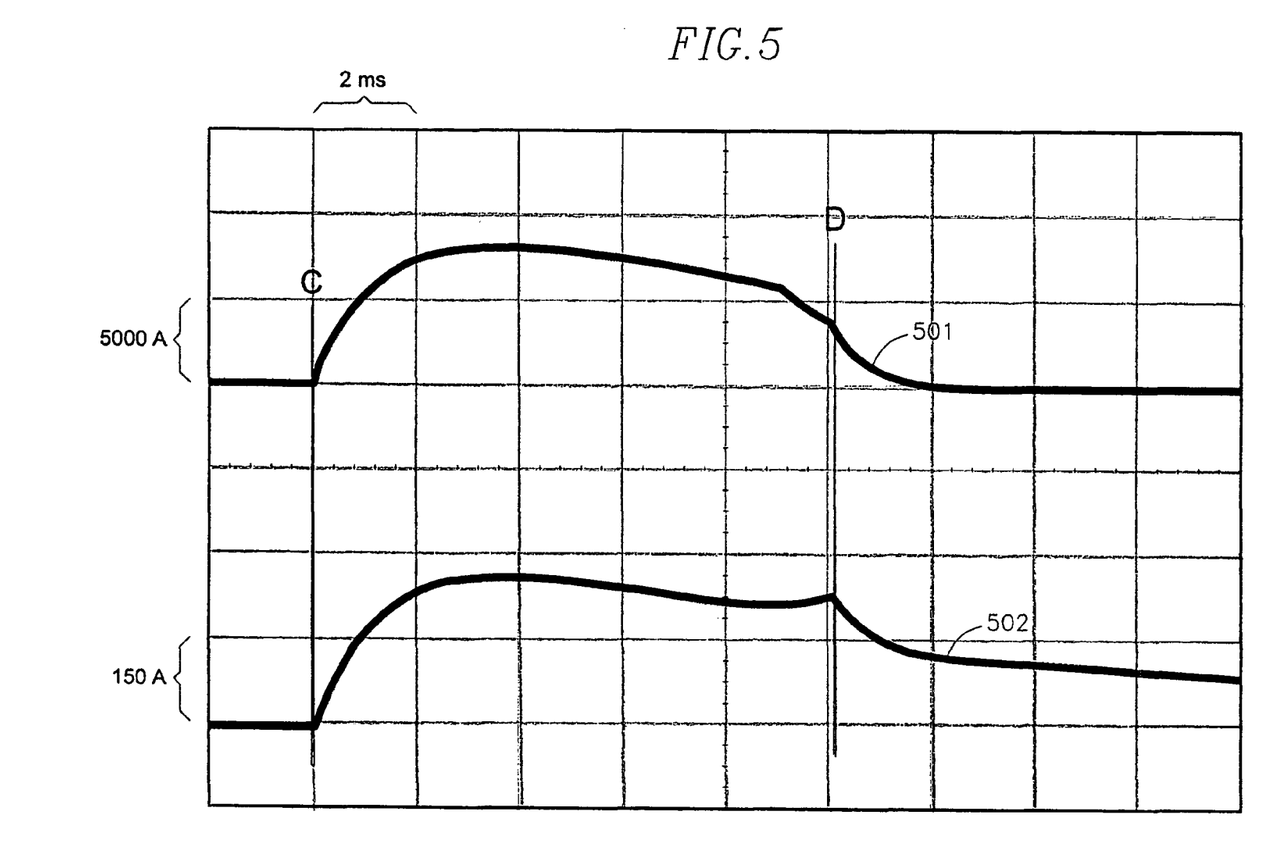
FIG. 5 is a plot of waveforms, in which the top waveform (i.e., secondary waveform) shows the secondary current and the bottom waveform (i.e., primary waveform) shows the current in the primary side of the CD welder. The primary current is shut off by the IGBT shortly after the primary current starts to increase again.

FIG. 5 is a plot of an oscilloscope trace when the primary current is shut off by the IGBT shortly after the primary current starts to increase again according to one exemplary embodiment of the present invention. The secondary waveform 501 shows the secondary current of a CD welder fired through a large fixed load (e.g., a giant resistor that does not heat up and change resistance during this type of weld pulse). The primary waveform 502 shows the current in the primary side of welder.

As indicated in FIG. 5, each division in the horizontal direction represents 2 ms. Further, for the secondary waveform 501, each division in the vertical direction represents about 5000 A, and for the primary waveform 502, each division in the vertical direction represents about 150 A. It can be seen that the switch is closed at time C to supply energy to the primary side (shown in the primary waveform 502) of the pulse transformer. Then the current across the secondary coil (shown in the secondary waveform 501) also starts to increase.

It can be seen in FIG. 5 that the primary current drops off sharply at about time D as indicated by the drop in the primary waveform 502, and the total energy output (the integrated area under the curve) is decreased dramatically (as compared with the primary waveform 402 of FIG. 4), but that the secondary pulse as illustrated by secondary waveform 501 has only a small reduction when compared with the first pulse (i.e., the secondary waveform 401 of FIG. 4).

A second known issue with CD welders is that the rate of rise of the current into the weld is rapid. In some conditions, this can be desirable. However, if the parts to be welded contain a resistive coating such as an oxide that forms while the parts are waiting to be assembled, a plating that can degrade or interfere with the weld, or if the parts themselves do not fit together well as they are placed in the weld fixture, then this fast rate of rise of current is undesirable. In the conditions mentioned above (and in similar conditions) the rapid rate of rise of current often leads to weld expulsion and sub-optimal weld strength.

If the rate of rise at which the current is put into the weld can be decreased, then the oxides or plating can be displaced before the peak weld current flows. This reduces the chance of expulsion. Similarly, if more time passes before peak weld current, parts that do not fit together well have some time during which to deform and fit together better before the peak weld current. Traditionally, CD welders have had different tap settings on their pulse transformer to change the duration of the entire weld pulse to deal with these conditions. However, these differing tap settings (differing primary to secondary windings ratios in the transformer) have substantially changed not only the rate at which the current rises into the weld, but also the overall timing during which the current flows. In addition, the peak voltage available to the weld changes with these settings.

Figure 6:
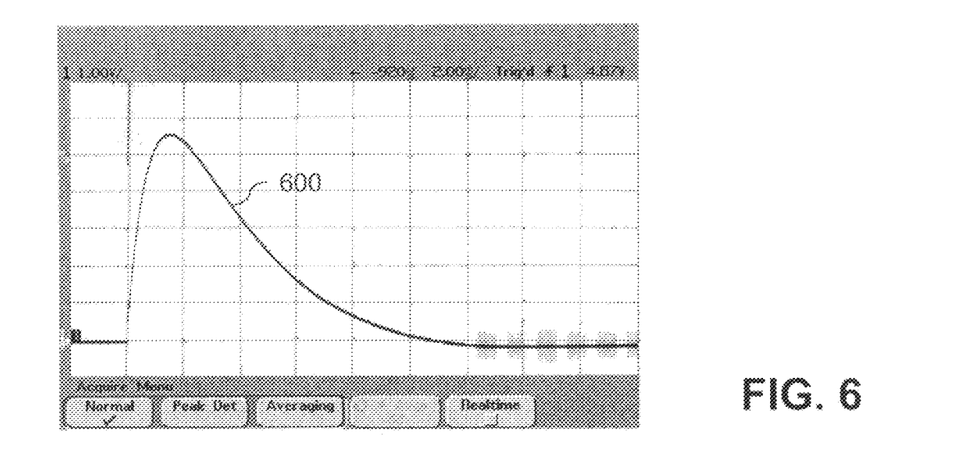
FIG. 6 is a plot of a waveform of a weld pulse without rapid switching to reduce the rate of rise of current.

An example of the energy input for a "traditional" or unswitched CD weld in an exemplary embodiment according to the present invention is illustrated in FIG. 6. For example, the waveform 600 of FIG. 6 can be generated by a capacitive discharge welder of FIG. 2 or FIG. 3.

In an exemplary embodiment according to the present invention, a capability to modify the rate at which energy is put into the discharge circuit is provided. In this embodiment, a capability is added to rapidly switch the semiconductor on and off multiple times during the initial energy input time while the current is rising. This repeated rapid switching of the semiconductor lengthens the time required to reach peak current. The discharge circuit may also be used to prevent saturation as described above.

In one embodiment, the IGBT is rapidly switched on and off at least 4 or 5 times. In another embodiment, the IGBT is rapidly switched on and off 15-20 times. In yet another embodiment, the IGBT is rapidly switched on and off on the order of 20 times over a period of about 1-3 ms. However, the present invention is not limited thereto. In the embodiments of the present invention, the number of times and exact timing may be controlled (e.g., through software control) and changed.

Returning now to FIG. 6, FIG. 6 illustrates a waveform 600 of the rising waveform of the energy input into the weld represented by voltage over time. In FIG. 6, each division in the horizontal direction represents 2 ms, and each division in the vertical direction represents about 1000 A. It can be seen in FIG. 6 that the waveform 600 reaches its peak less than 2 ms (e.g., about 1.5 ms) after the energy/current is first applied to the weld. The peak of the waveform 600 is at about 5600 A.

Figure 7:
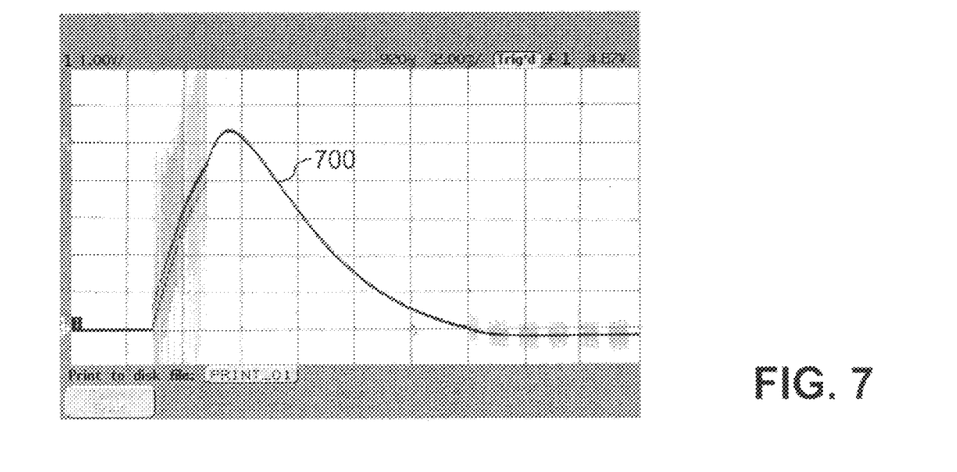
FIG. 7 is a plot of a waveform of a weld pulse with rapid switching to reduce the rate of rise of current.

FIG. 7 illustrates a waveform 700 of the rising waveform of the energy input into the weld represented by voltage over time, according to one exemplary embodiment of the present invention. Unlike FIG. 7, the switch (e.g., IGBT 204 of FIG. 2) is rapidly and repeatedly turned on and off to increase the rise time of the waveform, and reduce the peak energy level. By way of example, in one embodiment, the switch is turned on and off multiple (e.g., about 20) times over a time period (e.g., about 2 ms). The on/off period and timing may be variable. By way of example, the switching on and off may have a 10% duty cycle initially, then move to 90%. In one embodiment, the time on and time off may change throughout the multiple pulses being applied. However, the present invention is not limited thereto. The transient response (or noise) of the waveform 700 during the repeated, rapid switching of the switch is shown in FIG. 7.

In FIG. 7, each division in the horizontal direction represents 2 ms, and each division in the vertical direction represents about 1000 A. It can be seen in FIG. 8 that the waveform 700 reaches its peak about 2.8 ms after the energy/current is first applied to the weld. The peak of the waveform 700 is at about 5300 A.

Therefore, it can be seen by comparing FIGS. 6 and 7 that the peak energy is later in the pulse of waveform 700 compared to the waveform 600, and occurs at a somewhat lower level. This upslope feature helps the users to compensate for plating variation, surface contamination and/or poor "fit-up" between the parts to be welded. This repeated, rapid on-off switching method may also result in only limited losses in the semiconductor. Therefore, by repeatedly and rapidly switching the current on and off during the initial period of the weld, the time that it takes for the current to reach the peak can be extended.

A third known issue with CD welders is the means of welding small parts or parts with limited thermal capacity. This problem is most often noted on thin conductive foils that are welded to traces on substrates such as printed wiring boards. In order to get a good weld, a high peak current and a rapid rate of rise is required for this type of weld. However, the total thermal energy input to the welded joint must be minimized in order to prevent damage to the substrate. In this case, the energy input to the weld after the peak current occurs goes primarily to heating the part (thus increasing the risk of damaging the substrate) and does not contribute substantially to the strength of the weld.

A fourth issue with CD welders is the need to maximize the throughput of the welder. A fundamental requirement of the weld system is that the energy taken out of the capacitor bank in welding must be replenished before the next weld. Traditional CD welders using SCRs for switching must fully deplete the capacitor bank and see the voltage across the SCR fall to zero before they turn off. This extended discharge takes additional time (often on the order of 50 to 100 ms per weld) and dissipates additional energy from the capacitors, thus extending the time required to recharge them for the next weld.

In one exemplary embodiment according to the present invention, short, low energy pulses could be created from a fully charged capacitor bank by turning on and off the IGBT quickly. This allows the user to generate several short pulses in close proximity to each other as there is no need to recharge the capacitor bank between each pulse. The capability of doing one short pulse and leaving the capacitor bank with a nearly complete charge was demonstrated using an embodiment of the present invention.

Figure 8:
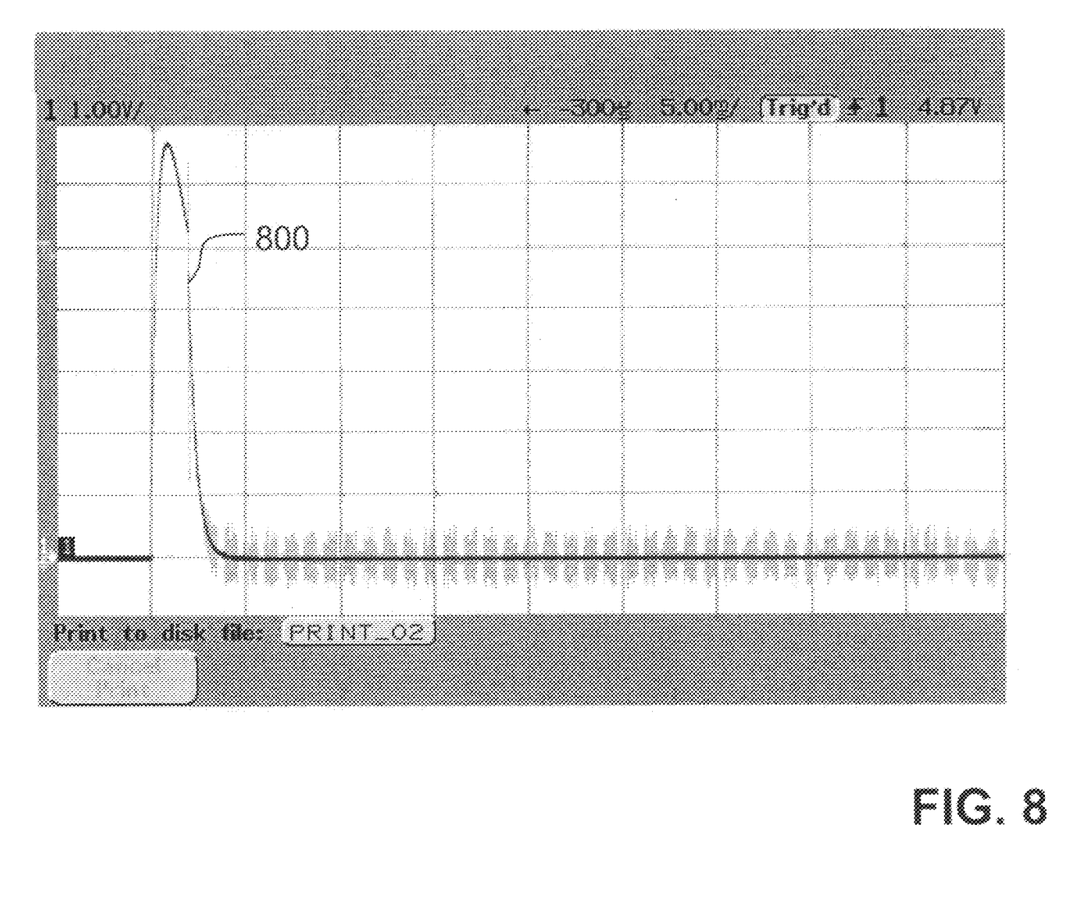
FIG. 8 is a plot of a waveform of a short duration rapid rise weld pulse.

The capability to do one short pulse for thin film conductive welds was also demonstrated. A graphical depiction of that waveform is shown in FIG. 8, which shows a short duration rapid rise weld pulse as a waveform 800. In FIG. 8, each division in the vertical direction represents about 1000 A and each division in the horizontal direction represents 5 ms. The waveform 800 reaches a peak current of about 6700 A at about 1 ms. However, the present invention is not limited thereto. This waveform 800 also demonstrates the short duration required before the capacitor recharge can begin. It can be seen in FIG. 8 that the weld pulse turns OFF at the 2 ms time. The periodic noise on the signal for the rest of the time period shown above is the charging circuit for the capacitors. It can be seen that the recharging starts much faster than the typical 100 ms from traditional SCR switched CD welders.

It will be appreciated by those with ordinary skill in the art that the invention can be embodied in other specific forms without departing from the spirit or essential character thereof. The embodiments described above should be considered to be illustrative and not restrictive.

What is claimed is:

1. A capacitive discharge welder comprising:
    a capacitor bank for storing energy;
    a pulse transformer for converting energy supplied only by the capacitor bank at a first voltage to energy at a second voltage;
    an insulated gate bipolar transistor (IGBT) for selectively electrically connecting the capacitor bank to the pulse transformer, wherein the IGBT is configured to electrically disconnect the capacitor bank from the pulse transformer prior to saturation of the pulse transformer in response to a control signal; and
    a secondary circuit electrically connected to the pulse transformer, the secondary circuit for supplying a welding current to a part to be welded based on the energy received from the capacitor bank and the second voltage.

2. The capacitive discharge welder of claim 1, further comprising a controller adapted to output a control signal to turn the IGBT on and off.

3. The capacitive discharge welder of claim 2, wherein the controller is adapted to turn off the IGBT after a delay to avoid saturation of the pulse transformer.

4. The capacitive discharge welder of claim 3, wherein the delay is user-programmable.

5. The capacitive discharge welder of claim 1, further comprising a controller adapted to repeatedly turn the IGBT on and off rapidly at a start of welding to reduce a rate of rise of the welding current.

6. The capacitive discharge welder of claim 5, wherein the controller is adapted to rapidly turn the IGBT on and off at least 4 or 5 times at the start of the welding.

7. The capacitive discharge welder of claim 1, further comprising a controller adapted to turn the IGBT on and off rapidly once to generate a short pulse.

8. The capacitive discharge welder of claim 1, wherein the second voltage has a voltage level that is lower than that of the first voltage.

9. A method of welding a part using a capacitive discharge welder comprising a capacitor bank for storing energy and a pulse transformer configured to supply welding current to a part in response to the stored energy, the method comprising:
    applying the welding current to the part by electrically connecting the capacitor bank to the pulse transformer to supply the stored energy to the pulse transformer; and
    turning of the welding current prior to saturation of the pulse transformer by electrically disconnecting the capacitor bank from the pulse transformer,
    wherein the energy supplied to the pulse transformer for applying the welding current is provided only from the capacitor bank.

10. The method of claim 9, wherein the capacitor bank is electrically disconnected from the pulse transformer prior to depletion of energy stored in the capacitor bank.

11. The method of claim 10, wherein the capacitor bank is electrically disconnected after a programmable delay.

12. The method of claim 9, wherein the welding current is repeatedly turned on and off quickly at a start of the welding to reduce a rate of rise of the welding current.

13. The method of claim 12, wherein the welding current is rapidly turned on and off at least 4 or 5 times at the start of the welding.

14. A method of claim 9, wherein the welding current is turned on and off quickly once to generate a short pulse corresponding to the current.

15. A capacitive discharge welder comprising:
    a capacitor bank for storing energy;
    a pulse transformer for converting energy supplied only by the capacitor bank at a first voltage to energy at a second voltage;
    a semiconductor switching device for selectively electrically connecting the capacitor bank to the pulse transformer, the semiconductor switching device configured to electrically disconnect the capacitor bank from the pulse transformer prior to depletion of energy stored in the capacitor bank in response to a control signal;
    a controller for providing the control signal to the semiconductor switching device; and
    a secondary circuit electrically connected to the pulse transformer, the secondary circuit for supplying a welding current to a part to be welded based on the energy received from the capacitor bank and the second voltage.

16. The capacitive discharge welder of claim 15, wherein the controller is adapted to turn off the semiconductor switching device after a user-programmable delay.

17. The capacitive discharge welder of claim 15, wherein the controller is adapted to repeatedly turn the semiconductor switching device on and off rapidly at a start of welding to reduce a rate of rise of the welding current.

18. The capacitive discharge welder of claim 15, wherein the controller is adapted to turn the semiconductor switching device on and off quickly once to generate a short pulse.

19. The capacitive discharge welder of claim 15, wherein the second voltage has a voltage level that is lower than that of the first voltage.

* * * * *